United States Patent
Krotnev et al.

(10) Patent No.: US 10,523,341 B1
(45) Date of Patent: Dec. 31, 2019

(54) METHODS AND SYSTEMS FOR IN-SITU CROSSTALK MEASUREMENTS IN COMMUNICATION SYSTEMS

(71) Applicant: HUAWEI TECHNOLOGIES CO., LTD., Shenzhen, Guangdong (CN)

(72) Inventors: Petar Ivanov Krotnev, Ottawa (CA); Davide Tonietto, Ottawa (CA); Marc-Andre LaCroix, Ottawa (CA)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/289,926

(22) Filed: Mar. 1, 2019

(51) Int. Cl.
*H04L 5/16* (2006.01)
*H04B 15/00* (2006.01)
*H04B 17/345* (2015.01)
*H04B 1/40* (2015.01)

(52) U.S. Cl.
CPC ............. *H04B 15/00* (2013.01); *H04B 1/40* (2013.01); *H04B 17/345* (2015.01)

(58) Field of Classification Search
CPC ... H04B 1/40; H04B 3/23; H04B 1/38; G01N 33/48721
USPC ........................................ 375/219, 221, 316
See application file for complete search history.

(56) References Cited

U.S. PATENT DOCUMENTS

| 2008/0040519 | A1* | 2/2008 | Starr ........................ H04L 49/90 710/39 |
| 2009/0304054 | A1* | 12/2009 | Tonietto .................. H04L 1/205 375/221 |

* cited by examiner

Primary Examiner — Khai Tran

(57) ABSTRACT

A method includes deactivating transmitters of a first plurality of transceivers that are associated with an endpoint to multi-channel communication fabric. A given transceiver of the first plurality of transceivers includes a receiver. The method includes controlling the given transceiver to cause the given transceiver to couple a reference source of the given transceiver to a first node of the receiver, measure a first value at a second node of the receiver, and determine a gain between the first node and the second node based on the measured first value. The method includes controlling the given receiver to cause the given receiver to isolate the reference source from the first node of the receiver; and measuring, by the given transceiver, a second value at the second node and determining, by the given transceiver, an intrinsic noise based on the measured second value. The method includes activating the deactivated transmitters; measuring, by the given transceiver, a third value at the second node and determining, by the given transceiver, a composite noise based on the measured third value; and determining, by the given transceiver, a crosstalk noise at the first node of the receiver based on the determined gain, the determined intrinsic noise and the determined composite noise.

20 Claims, 8 Drawing Sheets

METHODS AND SYSTEMS FOR IN-SITU CROSSTALK MEASUREMENTS IN COMMUNICATION SYSTEMS

BACKGROUND

Wireline transceivers are ubiquitous in a variety of applications, such as communication infrastructures, data centers and terminal chipsets. Wireline transceivers are responsible for connecting the processing core of communication-based integrated circuits (e.g., integrated circuits associated with switching fabric, traffic managers, network processors, and so forth) with the outside world. In general, a given wireline transceiver serializes outgoing data that is communicated from the processing core and de-serializes incoming data for the processing core. The wireline transceivers may communicate with the outside world over various communication media, including copper traces on printed circuit boards (PCBs), optical multiple mode fiber (MMF) fibers, single mode fiber (SMF) fibers, copper cables, and so forth. In general, the transceiver's processing rate (e.g., the symbol rate) may be significantly faster than the operational frequency of the processing core of the integrated circuit. As a result, the wireline transceiver may perform a variety of functions for the integrated circuit in addition to serializing and de-serializing data, such as functions pertaining to channel equalization; clock and data recovery; and retiming.

SUMMARY

Transceivers, such as serializing/de-serializing wireline transceivers, communicate with each other over imperfect media, thereby subjecting the communicated signals to impairments, such as insertion loss, reflections and crosstalk. These impairments may collectively degrade the signal-to-noise ratio (SNR) of the communication links and increase the associated bit error rates (BERs). The amount of crosstalk (called "crosstalk noise" herein) may be significant and difficult to manage, as the crosstalk noise may be relatively random (i.e., uncorrelated to the received data on the victim channel and may be contained in the channel frequencies). As such, the crosstalk noise may not be easily cancelled. Moreover, the crosstalk noise may be amplified by linear receiver side equalizers, such as feed forward equalizing (FFE) and/or continuous time linear equalizing (CTLE) filters, further compounding the impact of the crosstalk noise and degrading the BER.

It may therefore be beneficial to determine, or assess, the amount of crosstalk noise for a receiver of a wireline transceiver. One way to assess the amount of crosstalk noise for a particular wireline receiver is to estimate the theoretical crosstalk noise of the receiver based on a particular design for the receiver and the expected environment of the receiver using a simulation, for example. However, such an approach may be relatively inaccurate due to the complexities of the actual environment. In accordance with example implementations that are described herein, a communication system performs in place, or in-situ, crosstalk noise measurements. More specifically, in accordance with example implementations, for a given receiver of a given transceiver, the communication system is constructed to perform an in-situ measurement of crosstalk noise at the input of the receiver. In accordance with example implementations, the transceiver contains components, which aid the measurement of the in-situ crosstalk noise: a reference source and an amplitude detector, which allows the gain of the receiver to be determined; and a noise estimator. The noise estimator, as described herein, may be used to measure the intrinsic noise of the receiver at an internal node of the receiver (with the receiver's partner transmitter and aggressor transmitters being deactivated); determine a composite noise of the receiver at the internal node (with the partner transmitter being deactivated and the aggressor transmitters being activated); and determine a crosstalk measurement at the internal node based on the measured intrinsic and composite noises. Moreover, in accordance with example implementations, the noise estimator may be constructed to reference the determined crosstalk noise from the internal node to an input node of the receiver using the determined gain.

According to an aspect of the present disclosure, there is provided a method that includes deactivating transmitters of a first plurality of transceivers that are associated with an endpoint to multi-channel communication fabric. A given transceiver of the first plurality of transceivers includes a receiver. The method includes controlling the given transceiver to cause the given transceiver to couple a reference source of the given transceiver to a first node of the receiver, measure a first value at a second node of the receiver, and determine a gain between the first node and the second node based on the measured first value. The method includes controlling the given receiver to cause the given receiver to isolate the reference source from the first node of the receiver; measuring, by the given transceiver, a second value at the second node; and determining, by the given transceiver, an intrinsic noise based on the measured second value. The method includes activating the deactivated transmitters; measuring, by the given transceiver, a third value at the second node; determining, by the given transceiver, a composite noise based on the measured third value; and determining, by the given transceiver, a crosstalk noise at the first node of the receiver based on the determined gain, the determined intrinsic noise and the determined composite noise.

According to another aspect of the present disclosure, there is provided an apparatus that includes an integrated circuit that includes a reference source, a communication interface and a plurality of transceivers. The plurality of transceivers includes a plurality of receivers and a plurality of transmitters. The communication interface is to control the plurality of transceivers in an in-situ test to determine a crosstalk noise at an analog input of a given receiver of the plurality of receivers. The communication interface is programmable to deactivate the plurality of transmitters; couple the reference source to the analog input of the given receiver to provide a reference signal to the analog input of the given receiver; provide a first digital value representing a measurement of the reference signal by the given receiver; isolate the reference source from the analog input of the receiver; provide a second digital value representing a measurement of an intrinsic noise at the analog input of the given receiver; activate the deactivated plurality of transmitters; and provide a third digital value representing a composite noise at the analog input of the given receiver.

According to another aspect of the present disclosure, there is provided a system that includes multi-channel communication fabric; a plurality of multi-channel endpoints; and a controller. Each endpoint includes a plurality of transceivers that are coupled to the fabric, and each transceiver includes a transmitter and a receiver. The controller communicates with the plurality of endpoints to determine an in-situ crosstalk noise associated with the receiver of a first transceiver of the plurality of transceivers of a given endpoint of the plurality of endpoints. The transmitter of another endpoint is paired with the receiver of the first transceiver. The controller is to communicate with the plurality of endpoints to deactivate the transmitters; cause the first transceiver to couple a reference source of the first transceiver to an input of the receiver of the first transceiver; measure a first value at an internal terminal of the receiver of the first transceiver; and determine a gain based on the measured first value. The controller is to isolate the reference source of the first transceiver from the input of the receiver; cause the receiver of the first transceiver to measure a second value at the internal terminal and determine an intrinsic noise based on the measured second value. The controller is further to activate the transmitters except for the transmitter that is paired with the receiver of the first transceiver; cause the receiver of the first transceiver to measure a third value at the internal terminal, determine a composite noise based on the measured third value, and determine the in-situ crosstalk noise based on the determined intrinsic noise, the determined composite noise and the determined gain.

Optionally, in any of the preceding aspects, in another implementation, measurements of the first and second values at the second node occur during deactivation of the transmitters of the first plurality of transceivers and during deactivation of the transmitters of a second plurality of transceivers associated with another endpoint to the multi-communication fabric.

Optionally, in any of the preceding aspects, in another implementation, a transmitter of the deactivated transmitters of the second plurality of transceivers includes a partner transmitter for the receiver.

Optionally, in any of the preceding aspects, in another implementation, the measurements of the third value at the second node occurs during activation of the transmitters of the second plurality of transceivers except for the partner transmitter.

Optionally, in any of the preceding aspects, in another implementation, the first plurality of transceivers is part of a first integrated circuit; and deactivating the transmitters of the first plurality of transceivers includes a global controller associated with a second integrated circuit communicating with a local controller of the first integrated circuit.

Optionally, in any of the preceding aspects, in another implementation, the first and second integrated circuits are disposed on respective first and second circuit cards, the multi-channel communication fabric includes a backplane connecting first and second circuit card connectors, the first circuit card is installed in the first circuit card connector, and the second circuit card is installed in the second circuit card connector.

Optionally, in any of the preceding aspects, in another implementation, controlling the given transceiver to cause the given transceiver to couple the reference source of the given transceiver to the first node of the receiver, measure the first value at the second node of the receiver, and determine the gain between the first node and the second node based on the measured first value includes coupling the reference source to an input to a single conditioning circuit of the receiver and determining the gain based on a digital value that is provided by an analog-to-digital converter of the receiver.

Optionally, in any of the preceding aspects, in another implementation, the gain is adjusted in response to the digital value and a target range for the digital value.

Optionally, in any of the preceding aspects, in another implementation, adjusting the gain includes adjusting a gain that is applied by the signal conditioning circuit.

Optionally, in any of the preceding aspects, in another implementation, controlling the given transceiver to cause the given transceiver to couple the reference source to the first node, measure the first value at the second node and determine the gain between the first node and the second node includes writing data to at least one control register of the transceiver.

Optionally, in any of the preceding aspects, in another implementation, determining the crosstalk noise at the first node includes determining the crosstalk noise at a signal input terminal on the receiver.

Optionally, in any of the preceding aspects, the integrated circuit includes a digital signal processor that is associated with the receiver; the given receiver includes an analog-to-digital converter; and the digital signal processor to determine a gain between the analog input of the given receiver and an input of the analog-to-digital converter of the given receiver based on the first digital value.

Optionally, in any of the preceding aspects, in another implementation, the digital signal processor is to determine a crosstalk noise at the input of the analog-to-digital converter based on the second digital value or the third digital value; and determine the crosstalk noise at the analog input of the given receiver based on the determined crosstalk noise at the input of the analog-to-digital converter and the determined gain.

Optionally, in any of the preceding aspects, the reference source includes a bandgap voltage reference circuit.

DETAILED DESCRIPTION

Figure 1:
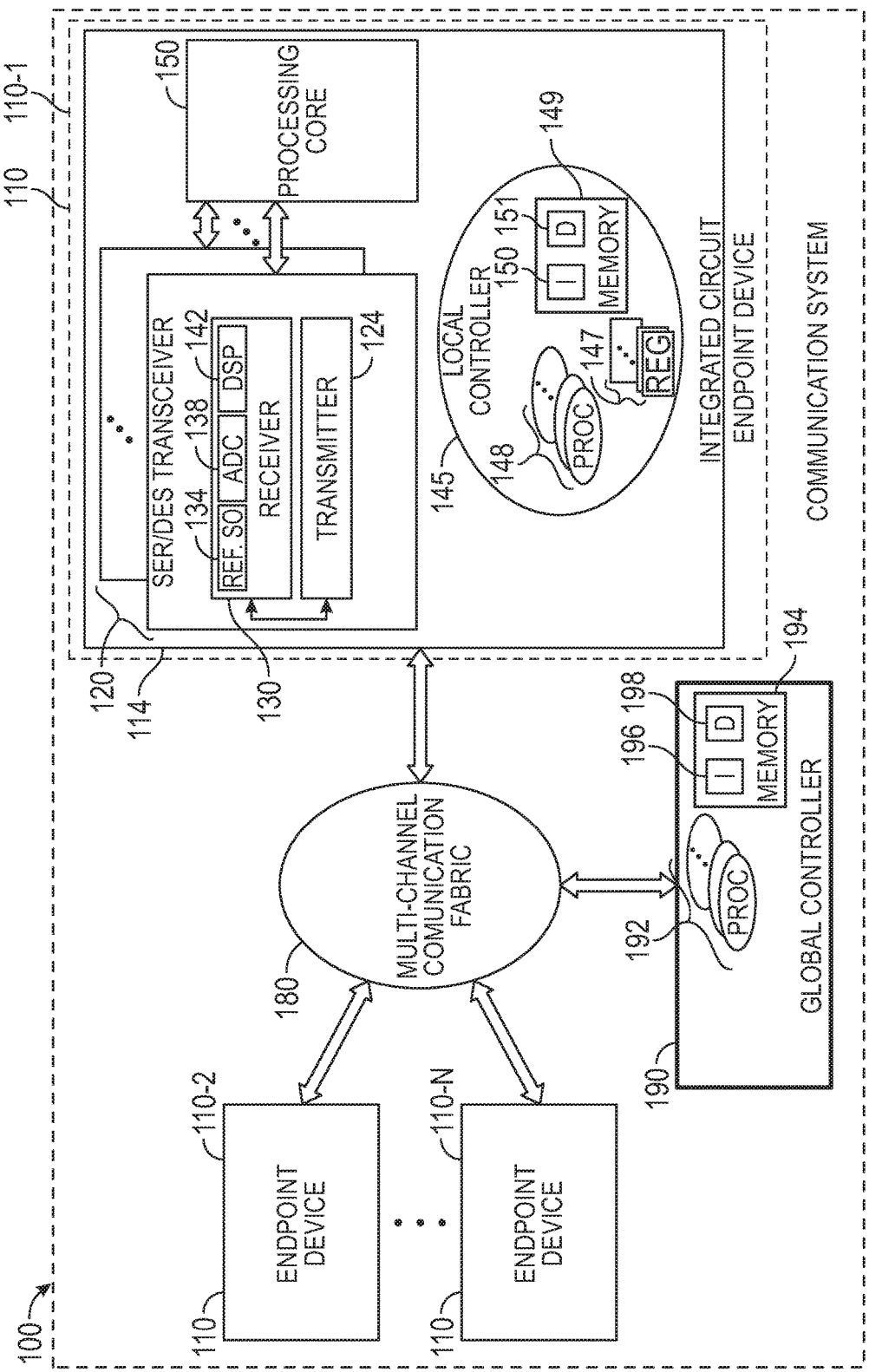
FIG. 1 is a schematic diagram of a communication system having a serializing/de-serializing wireline transceiver that has features to determine an in-situ crosstalk noise associated with a receiver of the transceiver according to an example implementation.

In the context of this application, "crosstalk noise," or "crosstalk," refers to noise that is coupled from one or more communication links, called "aggressor links," to another communication link, called a "victim link." Here, the "victim link" corresponds to a receiver and more specifically, corresponds to a communication path of a receiver. The receiver may be paired with a transmitter, and the aggressor communication links correspond to other transmitters, which may generate signals that cause energy (i.e., crosstalk noise) to be coupled to the victim link. The "crosstalk noise" refers to any assessment or measurement of the crosstalk noise and may be, for example, a root mean square (RMS) noise or any other measure of the crosstalk noise.

In accordance with an example implementation, a communication system may include multiple serializing/de-serializing wireline transceivers that communicate over multiple channels of the communication system. In this manner, in accordance with example implementations that are described herein, the wireline transceivers may be paired, such that pairs of transceivers communication with each other over corresponding channels. Due to these multi-channel communications, there may be ample opportunity for crosstalk noise to be produced on a given receiver's input.

In accordance with example implementations that are described herein, a global controller of a multi-channel communication system may communicate with transceivers of the system to measure in-situ cross-talk noises associated with the receivers of the system. More specifically, in accordance with example implementations, the global controller may perform an in-situ crosstalk noise measurement for a given receiver (called the "receiver under test" herein) of a given transceiver (called the "transceiver under test" herein) as follows. The global controller may first communicate with the transceiver corresponding to the partner transmitter and aggressor transmitters to disable, or deactivate, these transmitters. Next, the global controller may communicate with the transceiver under test to cause receiver to (as further described herein) determine the receiver's gain (e.g., the gain from an input of the receiver to an internal node of the receiver) and intrinsic noise (i.e., the noise in the absence of transmissions by the partner and aggressor transmitters). The global controller may then communicate with the transceivers corresponding to the aggressor transmitters to enable, or activate, these transmitters (leaving the partner transmitter still deactivated). With the communication system in this state, the global controller may then communicate with the transceiver under test to cause the receiver to determine its composite noise (i.e., a total noise, having the in-situ crosstalk noise and intrinsic noise as components) and thereafter calculate the crosstalk noise referenced to the input of the receiver based on the determined intrinsic noise, determined composite noise and determined gain.

More specifically, in accordance with example implementations, the receiver under test may contain several components that allow the receiver to measure values and from these measured values, determine the gain, intrinsic noise, composite noise, and crosstalk noise. In particular, for purposes of processing the measured values, the receiver may have a processing component, such as a digital signal processor (DSP), which operates at a relatively high clocking rate, relative to a processing core of an integrated circuit that contains the transceiver. Due to this ability to process a relatively high rate of computations, the transceiver may perform various calculations pertaining to the derivation of an in-situ crosstalk noise for the receiver. In accordance with some implementations, the receiver contains an analog-to-digital converter (ADC), and the ADC provides digital output values from which the receiver determines the gain, intrinsic noise and composite noise.

For purposes of determining its gain, the receiver (or, in general, the receiver) may contain a reference source, such as a precision bandgap voltage reference circuit. The receiver couples the output of the reference source to the input of the receiver for purposes of establishing a known reference value (for the example of the bandgap voltage reference, a known voltage) at the input of the receiver. This allows the DSP to determine the gain based on the known value of the source output and the digital output value that is provided by the ADC. In accordance with example implementations, the gain of the receiver is the direct current (DC) gain of the receiver and refers to the gain between the analog input terminal of the receiver and the output of the ADC. The calculation of the gain, in turn, allows the DSP to reference a derived crosstalk measurement estimation back to the analog input terminal of the receiver.

To determine the intrinsic noise of the receiver under test, the reference source is isolated, or decoupled, from the input of the receiver; and as noted above, the aggressor and partner transmitters are disabled, or deactivated. For this state of the communication system, the digital output value that is provided by the ADC represents the intrinsic noise for the receiver, i.e., the noise present when no sources, or transmitters, are coupled to the analog input of the receiver.

To determine the composite noise of the receiver under test, the aggressor transmitters are enabled, or activated, and the partner transmitter remains deactivated, as noted above. For this state of the communication system, the digital output value that is provided by the ADC represents a composite noise for the receiver, i.e., the total noise measured at the ADC output, which contains a crosstalk noise component and an intrinsic noise component. The DSP may then, based on the ADC output values representing the measurement of the gain, intrinsic noise and composite noise, determine the in-situ crosstalk noise at the input of the receiver under test.

In a similar manner, the global controller may control the communication system for purposes of measuring the in-situ crosstalk noises of other receivers of the communication system.

As a more specific example, FIG. 1 depicts an example implementation of a multiple channel (or "multi-channel") communication system 100 in accordance with some implementations. In general, the communication system 100 includes multiple endpoint devices 110 (N example endpoint devices, being represented in FIG. 1), which form corresponding endpoints to multi-channel communication fabric 180. As further described herein, the multi-channel communication fabric 180 may take on various forms, depending on the particular application. In this manner, the multi-channel communication fabric 180 may represent, one or multiple wired communication media, such as copper traces on PCBs, wires of a cable, MMF optical fibers, SMF optical fibers, and so forth.

Regardless of its particular form, in general, the multi-channel communication fabric 180 provides communication paths for multiple communication channels. In this manner, the endpoint devices 110 include multiple transceivers, and in general, the transceivers of a given endpoint device 100 may be paired with corresponding transceivers of another endpoint device 100. As a more specific example, as illustrated in FIG. 1, in accordance with some implementations, a given endpoint device 110 (here, endpoint device 110-1) may include one or multiple integrated circuits 114. In accordance with example implementations, the integrated circuit 114 may be any of a number of network devices, such as a network switching fabric device, a network traffic management device, a network processing device, and so forth.

As illustrated for endpoint device 110-1, a given integrated circuit 114 may include one or multiple serializing/de-serializing wireline transceivers 120 (called "transceivers 120" herein). In general, the transceiver 120 performs analog-to-digital conversions (for received data) and digital-to-analog conversions (for data to be transmitted); and for these purposes, the transceiver 120 includes a serializing receiver 130 and a de-serializing transmitter 124. The receiver 130 may include such components as a reference source 134, an ADC 138 and a DSP 142. Further details of the receiver 130 are set forth below. The transmitter 124, in general, may include such components as a digital-to-analog converter (DAC) and a DSP.

As depicted in FIG. 1, in accordance with example implementations, the integrated circuit 114 may include multiple transceivers 120 and a common processing core 150 that communicates with the multi-channel communication fabric 180 via the transceivers 120. In general, the processing core 150 may include one or multiple of the following data processing components: central processing units (CPUs); CPU cores; application specific integrated circuit (ASICs); field programmable gate arrays (FPGAs), and so forth.

Regardless of its particular form, the processing core 150 may perform various processing functions for the integrated circuit 114, such as functions related to switching fabric, traffic managing, network data processing, and so forth, for purposes of communicating data to and from the integrated circuit 114. In accordance with example implementations, the DSPs of the receiver 130 and transmitter 124 may perform a variety of functions for the integrated circuit 114, due to the increased operational frequencies of the digital processing components of the transceivers 120 (relative to the processing frequency of the processing core 150), such as functions related to channel equalization, clock and data recovery, retiming, serializing and de-serializing input symbols/data, and so forth. Moreover, the DSP of the receiver 130 may perform various calculations pertaining to an in-situ crosstalk noise measurement for the receiver 130 and may control aspects of the crosstalk measurement test, as further described herein.

In accordance with example implementations, the transceiver 120 may include a communication interface, which allows the transceiver 120 to be controlled by a global controller 190 for such purposes of enabling and disabling the transmitter 124 of the transceiver 120; and controlling the receiver 130 to cause the receiver 130 to, when under test, perform operations pertaining to measuring the receiver's in-situ crosstalk noise, including operations related to determining the receiver's gain, intrinsic noise and composite noise, and determining the cross-talk noise at the input of the receiver based on the gain, intrinsic noise and composite noise.

For the example implementation that is depicted in FIG. 1, the integrated circuit 114 may include a local controller 145 that contains one or multiple addressable registers 147, which the global controller 190 may write to and read from for such purposes as instructing the local controller 145 to take such actions as deactivating transmitters 124 of the integrated circuit 114, activating transmitters 124 of the integrated circuit 141, initiating operation of an amplitude detector (further described herein) of a particular receiver 130 under test (as further described herein), initiating operation of a noise estimator (as further described herein) of the receiver 130, reading a value representing an in-situ crosstalk noise measured by the noise estimator, and so forth.

In accordance with some implementations, in addition to the registers 147, the local controller 145 may include one or multiple processors 148 (one or multiple central processing units (CPUs), one or multiple CPU processing cores, and so forth). In general, the processor(s) 148 may execute instructions 150 that are stored in a memory 149 of the local controller 145 for purposes of performing one or more aspects of controlling the transceivers 120 on the integrated circuit 114 for purposes of performing an in-situ crosstalk noise measurement for a given receiver 130 (of a given transceiver 120). In general, the memory 149 is a non-transitory memory that may be formed from semiconductor storage devices, magnetic storage devices, memristor-based devices, non-volatile memory devices, phase change storage devices, volatile memory devices, a combination of storage devices associated with any combination of the foregoing storage technologies, and so forth. In accordance with further example implementations, the local controller 145 may be formed from whole or part from a controller that does not execute machine executable instructions, such as a field programmable gate array (FPGA), application specific integrated circuit (ASIC), and so forth.

In accordance with further example implementations, each transceiver 120 of the integrated circuit 114 may contain a local controller 145. For example, the local controller, amplitude detector and noise estimator may be formed at least in part by the DSP 142 of the receiver 130. In accordance with yet further example implementations, the integrated circuit 114 may not have a local controller that communicates with the global controller 190; and in place, the integrated circuit 114 may have a set of readable and writable registers that allow selection of the receiver under test; initiate the above-described cross-talk measurement phases (i.e., phases to determine the gain, intrinsic noise, composite noise and cross-talk noise) for the receiver under test via register writes; and provide data representing the derived in-situ cross-talk noise for the receiver under test. Thus, depending on the particular implementation, the integrated circuit may contain no, one or multiple local controllers.

As depicted in FIG. 1, in accordance with some implementations, the global controller 190 may communicate with the communication interfaces of the transceivers 120 via the multi-channel communication fabric 180, may be separate from the integrated circuits 114 and may be separate from the endpoint devices 110. In accordance with further example implementations, the global controller 190 may be a component of one of the integrated circuits 114. Thus, depending on the particular implementation, the global controller 190 may be disposed on the integrated circuit 114, may be part of a particular endpoint device 110 or may be separate from the endpoint devices 110.

In accordance with some implementations, the global controller 190 may contain one or multiple processors 192 (one or multiple central processing units (CPUs), one or multiple processing cores, and so forth), which execute machine executable instructions 196 that are stored in a memory 194. In addition to the instructions 196, the memory 194 may store data 190, which represents, for example, variables associated with the in-situ crosstalk measurements, the in-situ crosstalk measurements, and so forth. In general, the memory 194 is a non-transitory memory that may be formed from one or multiple storage devices, similar to the memory 149 described above.

In accordance with further example implementations, the global controller 190 may be formed, in whole or in part, from hardware that does not execute machine executable instructions, such as, as examples, an ASIC, a field programmable gate array (FPGA), and so forth. Thus, many implementations are contemplated, which are within the scope of the appended claims.

Figure 2:
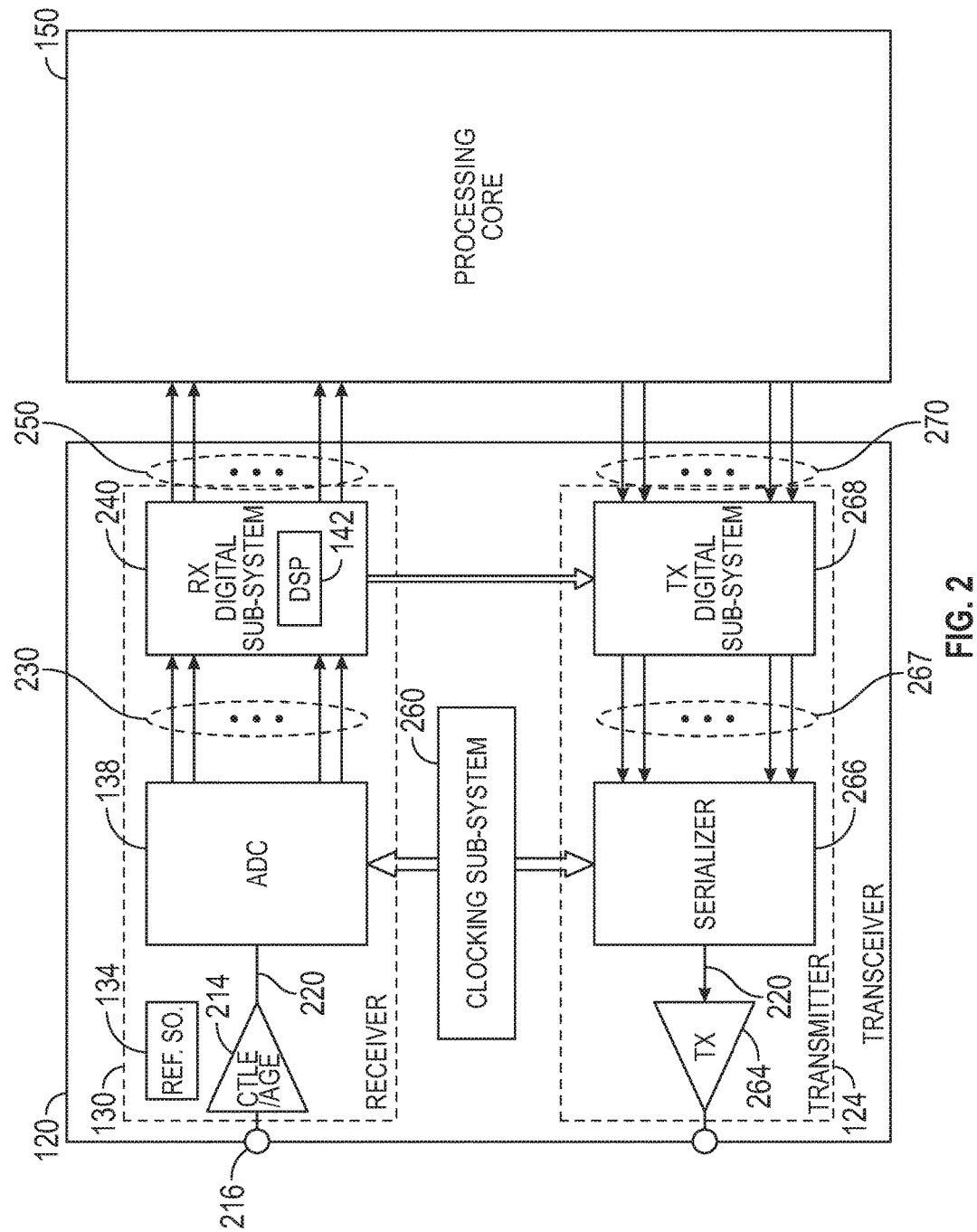
FIG. 2 is a schematic diagram of a transceiver and its relation to a processing core of the integrated circuit of FIG. 1 according to an example implementation.

Referring to FIG. 2, in accordance with example implementations, in addition to the receiver 130 and transmitter 124, the transceiver 120 may include a clocking sub-system 260 that supplies clock signals to the receiver 130 and transmitter 124. The transceiver 120 receives a signal representing serial data at an input terminal, or node 216, of the receiver 130; and the transceiver 120 provides parallel data to the processing core 150 via digital bit signals 250. The transceiver 120 receives parallel data from the processing core 150 via digital bit signals 270.

As depicted in FIG. 2 the DSP 142 of the receiver 103 may be part of a receiver digital sub-system 240 of the receiver 130. In this manner, the receiver digital sub-system 240 may perform traffic management and/or traffic processing functions for the processing core 150; and the digital sub-system 240 may perform calculations to derive a crosstalk noise at the input node 216, as further described herein. In general, the ADC 138 of the receiver 130 is a slicer, or de-serializer, which provides digital output signals 230 that represent the digital value of a sampled analog signal that is provided by a sample and hold circuit (not shown). In this manner, the sample and hold circuit samples an analog output signal that is provided by a signal conditioning circuit 214 and provides the sampled analog signal to the input of the ADC 138. The signal conditioning circuit 214 receives an analog signal from the input node 216 and provides a conditioned signal to the analog input 220 of the ADC 138.

In accordance with example implementations, the signal conditioning circuit 214 may include a continuous time linear equalizing (CTLE) filter and may include an automatic gain control (AGC) amplifier. In accordance with an example implementation, the signal conditioning circuit 214 has a gain that is relatively flat from near zero frequency through the receiver's channel frequency. In other words, the DC gain of the signal conditioning circuit 214, in accordance with an example implementation, may be viewed as the gain of the circuit 214. As a more specific example, in accordance with some implementations, the signal conditioning circuit 214 may have a frequency response that is similar to or the same as a Butterworth filter. The signal conditioning circuit 214 may not have a relatively flat frequency response from DC through the channel frequency and as such, may have a frequency response other than a Butterworth filter frequency response, in accordance with further example implementations.

The transmitter 124 may include a serializer 266, such as a DAC and a transmitter digital sub-system 268; and the transmitter 124 may include a transmitting amplifier 264 that drives an analog signal to the node 216 (i.e., the node 216 may serve as an input node and an output node, in accordance with example implementations.

Figure 3:
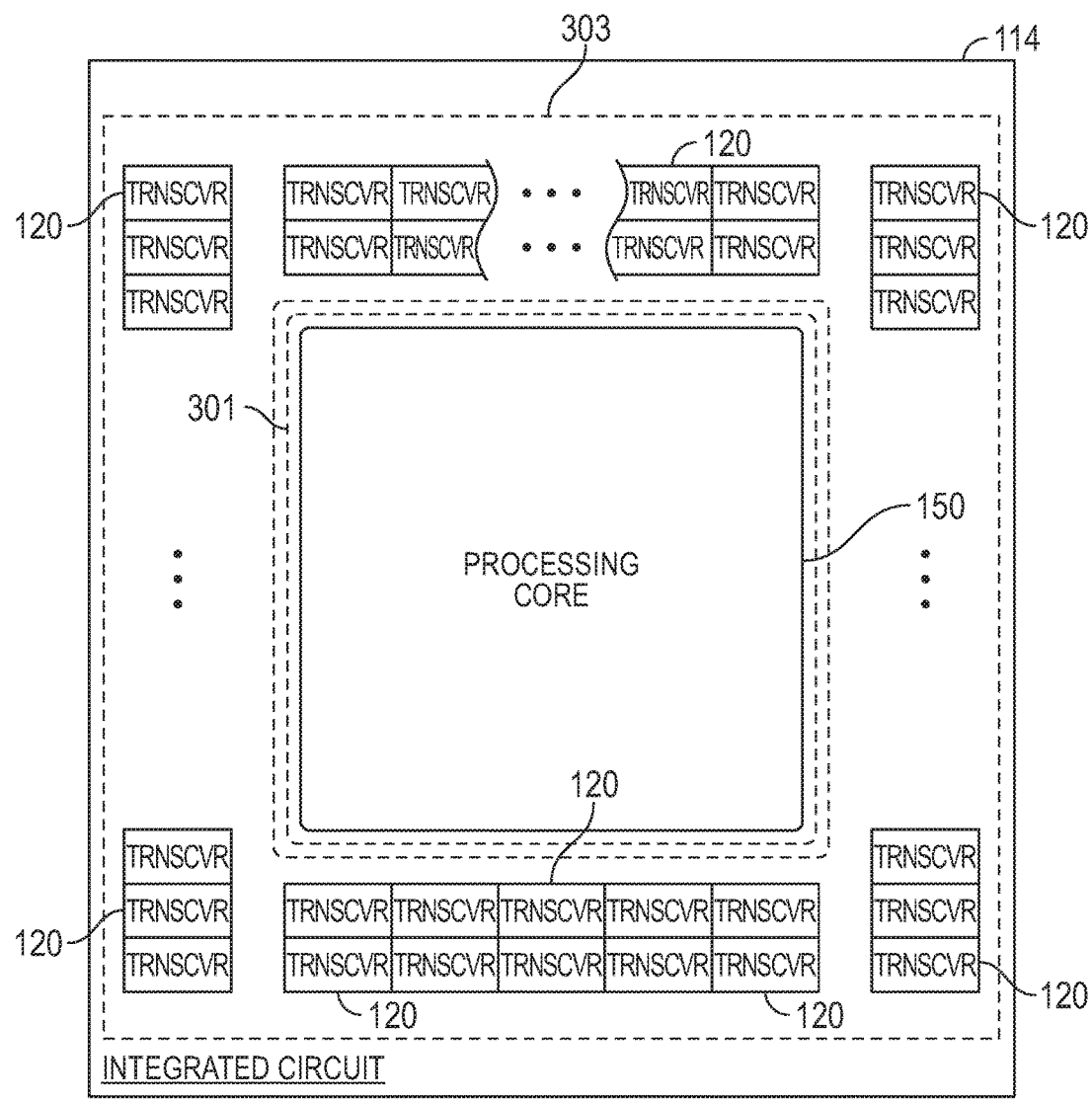
FIG. 3 is a schematic diagram illustrating a spatial layout of the integrated circuit of FIG. 1 according to an example implementation.

FIG. 3 depicts a spatial layout of the integrated circuit 114, in accordance with example implementations. The integrated circuit 114 may have relatively large number of transceivers 120, such as 100 to 200 transceivers 120 on a single die. The processing core 150 being disposed in a central region 301 of the die and the transceivers 120 may be disposed in the outer, or peripheral region 303 of the die, which surrounds the central region 301. The relatively high spatial density of the transceivers 120 may potentially contribute to relatively large crosstalk noises and as such, increases the importance of the built-in, or in-situ, crosstalk noise measurement test, as described herein.

Figure 4:
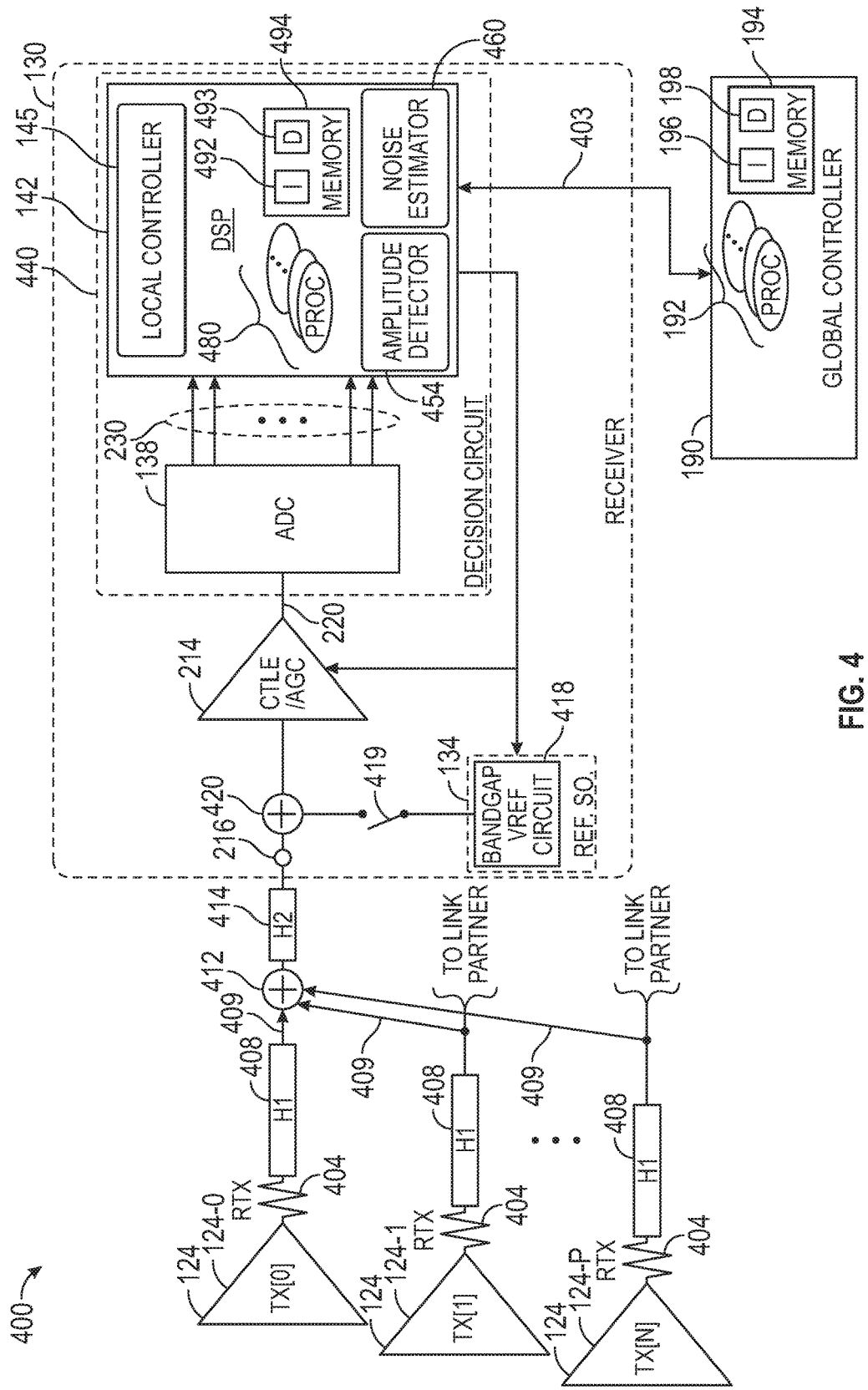
FIG. 4 is a schematic diagram of a system to determine an in-situ crosstalk noise associated with a receiver of a wireline transceiver according to an example implementation.

FIG. 4 illustrates an environment 400 of the in-situ crosstalk measurement test, in accordance with an example implementation. As depicted in FIG. 4, a decision circuit 440 of the receiver 130 includes the ADC 138 and the DSP 142. For this example implementation, the DSP 142 may include such components as the local controller 145; an amplitude detector 454 to determine a gain of the receiver 130 (as further described below in connection with FIG. 7); and a noise estimator 460 to determine the intrinsic, composite and crosstalk noises for the receiver 130 (as further described below in connection with FIG. 8). In accordance with an example implementation, these components may be formed from one or multiple processors 480 (one or multiple CPU cores, CPUs, and so forth) of the DSP 142 executing machine executable instructions 492 (i.e., software or firmware) that are stored in a memory 494 of the DSP 142. In general, the memory 494 is a non-transitory memory that may be formed from one or multiple storage devices associated with one or multiple storage technologies, similar to the other memories that are described herein. Moreover, the memory 494 may store data 493 pertaining to variables used by the local controller 145, amplitude detector 454 and noise estimator 460, data representing the derived in-situ crosstalk measurement, data representing digital values appearing at the output of the ADC 138 during different phases of the crosstalk measurement test, data representing a determined intrinsic noise for the receiver 130, data representing a determined composite noise of the receiver 130, data representing a determined gain for the receiver 130, data representing intermediate values that are calculated as part of the crosstalk measurement test, and so forth. The global controller 190 may communicate with the local controller 145 via a communication path 403 (a path established by the fabric 180, for example).

As depicted in FIG. 4, in accordance with example implementations, the receiver 130 may include a switch 419 that may be controlled to close the switch 419 for purposes of coupling a bandgap voltage reference circuit 418 (i.e., for this implementation, the reference source 134) to the input node 216 of the receiver 130. The switch 419 may also be controlled to open the switch 419 to decouple, or isolate, the bandgap voltage reference circuit 418 from the input node 216. It is noted that the switch 419 represents the functional coupling/decoupling of the bandgap voltage reference circuit 418 to the input node 216 and may or may not be a device that is disposed between the output of the circuit 418 and the input node 216. For example, in accordance with some implementations, the output terminal of the bandgap reference circuit 418 may be connected to the input node 216; and the switch 419 may be formed from a transistor, such as a complementary metal-oxide-semiconductor (CMOS) transistor, that is disposed in the main current path of the bandgap voltage reference circuit 418 and is turned on and off to correspondingly enable and disable the circuit 418. In accordance with further example implementations, the bandgap voltage reference circuit 418 may remain functional, and the switch 419 may be disposed between the output terminal of the bandgap voltage reference circuit 418 and the input node 216 to selectively couple the output terminal to the node 216.

In accordance with example implementations, as depicted by summation 420, the coupling of the bandgap reference source 418 to the input terminal 416 causes the addition of a bandgap reference voltage (provided by the circuit 418) to the input terminal 216. When all other transmitters 124 are deactivated, the receiver 130 under test receives the voltage provided by the bandgap voltage reference circuit 418 as its input.

The reference source 134 may be a source other than a bandgap voltage reference circuit, in accordance with further example implementations.

FIG. 4 depicts the coupling of aggressor and partner transmitters to the input node 216 of the receiver, in accordance with example implementations. In particular, FIG. 4 depicts a partner transmitter 124-0 for the receiver 130. The partner transmitter 124-0 has an associated transmitter output impedance 404 and an associated impedance 408 between the output terminal of the transmitter 124-0 and a summation node 412. In general, the summation node 412 represents the coupling of energy produced by aggressor communication links to the input node 126 of the receiver 130. In this manner, FIG. 4 depicts P example aggressor transmitters 124-1 to 124-P; and these aggressor transmitters 124-1 to 124-P, in turn, may be coupled to corresponding partner links.

In operation, energy produced by the aggressor transmitters 124-1 to 124-P is coupled to the summation node 412 and passes through an impedance 414 to the input terminal 216 of the receiver under test. As an example, the impedance 408 may represent the impedance of the multi-channel communication fabric 180 (FIG. 1), such as, for example, the impedance represented by copper traces of a backplane; and the impedance 414 may represent, for example, the impedance locally with respect to the integrated circuit 114, such as, for example, the impedance representing the connector slot and traces on a network card on which the integrated circuit 114 is disposed, for example. As depicted in FIG. 4, the aggressor transmitters 124-1 to 124-P each have a corresponding impedance 408.

Figure 5:
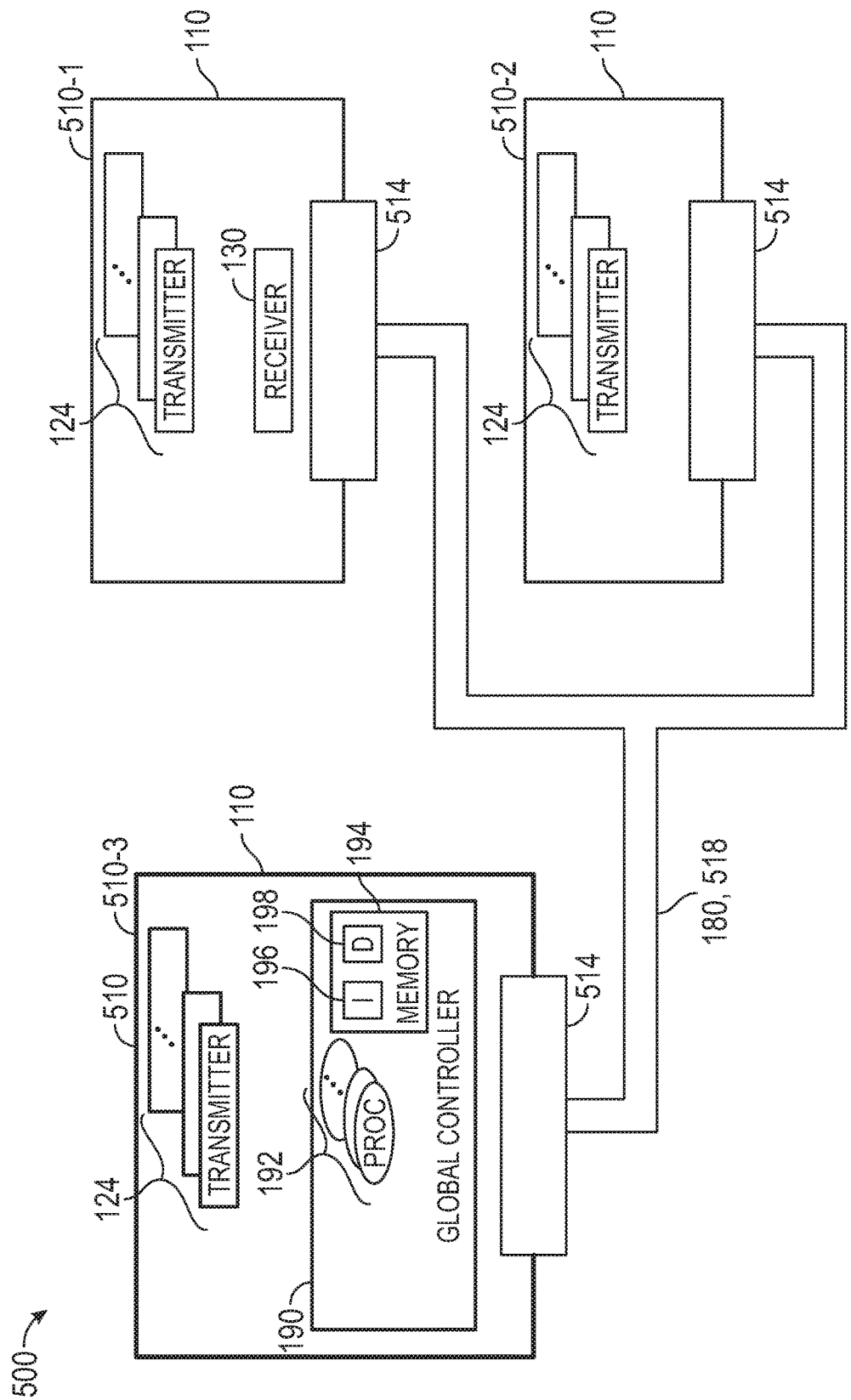
FIG. 5 is a schematic diagram illustrating implementation of the communication system of FIG. 1 in a system including a backplane and circuit cards according to an example implementation.

FIG. 5 is an example implementation 500 of the communication system 100 (FIG. 1) for the case in which there are three endpoint devices 110 (i.e., N=3). In this regard, for this example implementation, the endpoint devices 110 are circuit cards 510, which are inserted, or installed in, corresponding slot connectors 514. The slot connectors 514, in turn, may be part of a box, or rack, and are coupled together by copper traces of a corresponding backplane 518. For this example, the receiver under test 130 is part of a circuit card 510-1, and the circuit card 510-1 may include one or multiple aggressor transmitters 124. Moreover, the other circuit cards 510-2 and 510-3, for this example implementation, may include one or multiple transmitters 124, with one of these transmitters 124 being the partner transmitter for the receiver 130 and the other transmitters 124 being aggressor transmitters. As also depicted in FIG. 5, for this example implementation, the circuit card 510-3 contains the global controller 190.

Figure 6:
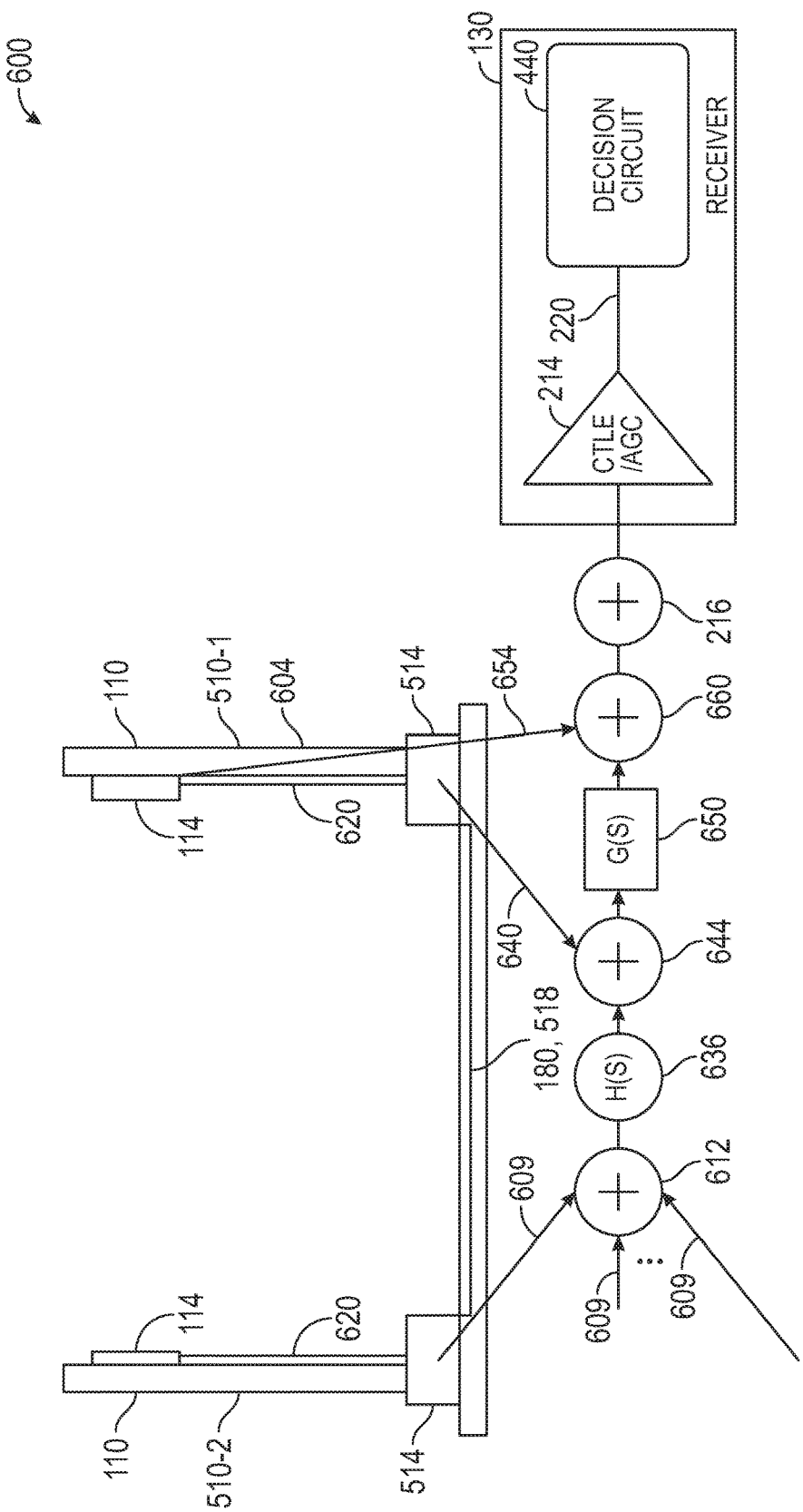
FIG. 6 is an illustration of impedances associated with a structure of the system of FIG. 5 according to an example implementation.

FIG. 6 depicts an example structure 600 that contains the circuit cards 510 and illustrates the corresponding impedances and crosstalk coupling of the structure 600. Aggressor transmitters on circuit cards 510 other than the circuit card 510-1 that contains the receiver under test each contribute energy (as represented by arrows 609 and summation 612) to the crosstalk noise, and this energy propagates backplane 518 and experiences a backplane impedance 636. Aggressor transmitters on the circuit card 510-1 that contains the receiver under test also contribute energy (as represented by arrow and summation 644) to the crosstalk noise; and the composite energy from all of these aggressor transmitters propagate over communication paths 620 of the circuit card 510-1, as represented by impedance 650, and are cumulatively contribute to the crosstalk noise at the input node 216, as represented by summation 660. In the in-situ crosstalk noise measurement, the decision circuit 440 initially determines the crosstalk noise at the output 220 of the signal conditioning circuit 214 of the receiver 130 and then, using the determined gain of the circuit 214, the decision circuit 440 determine the crosstalk noise at the input node 216.

Figure 7:
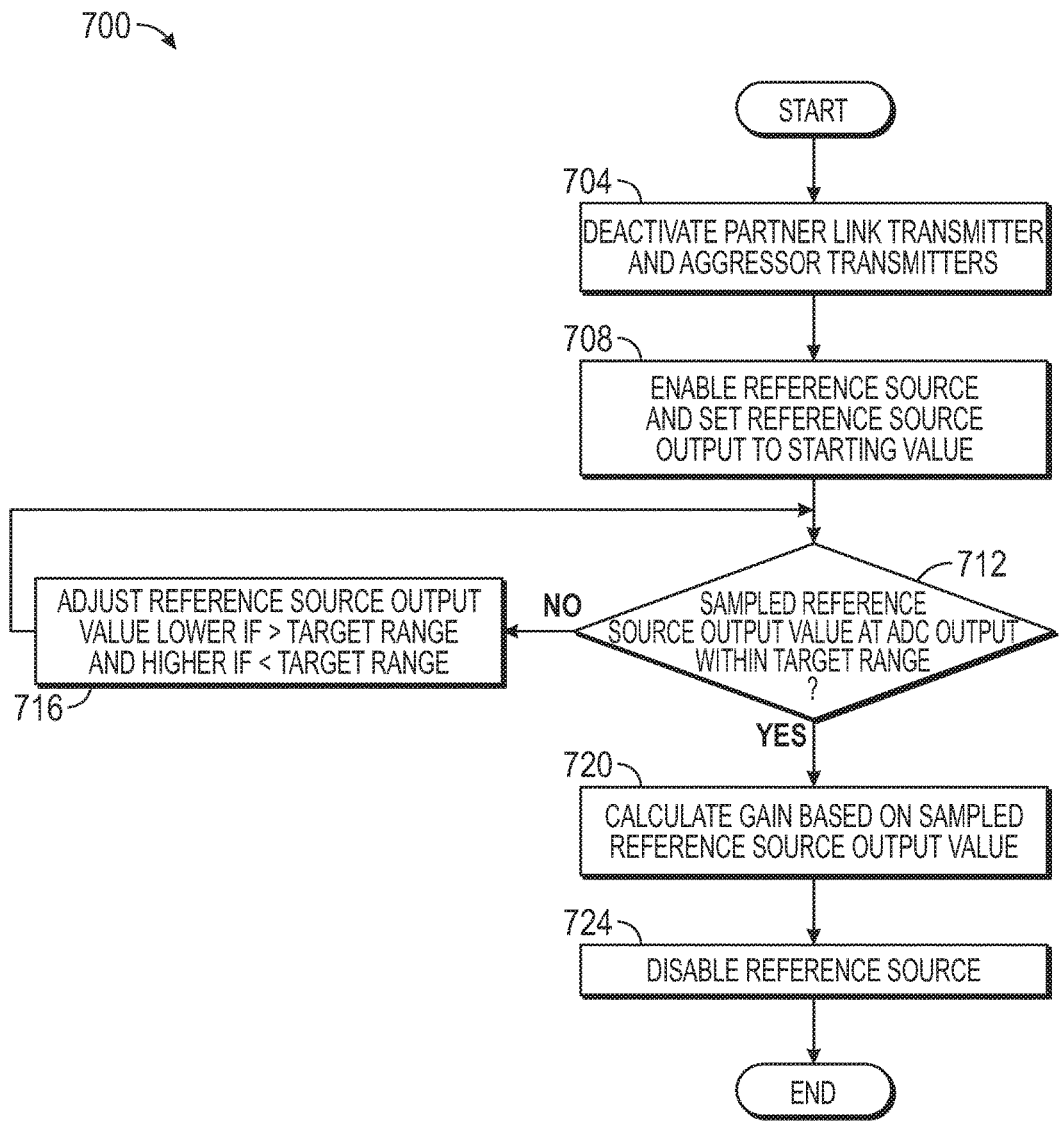
FIG. 7 is a flow diagram depicting a technique to determine a gain of a receiver according to an example implementation.
Figure 8:
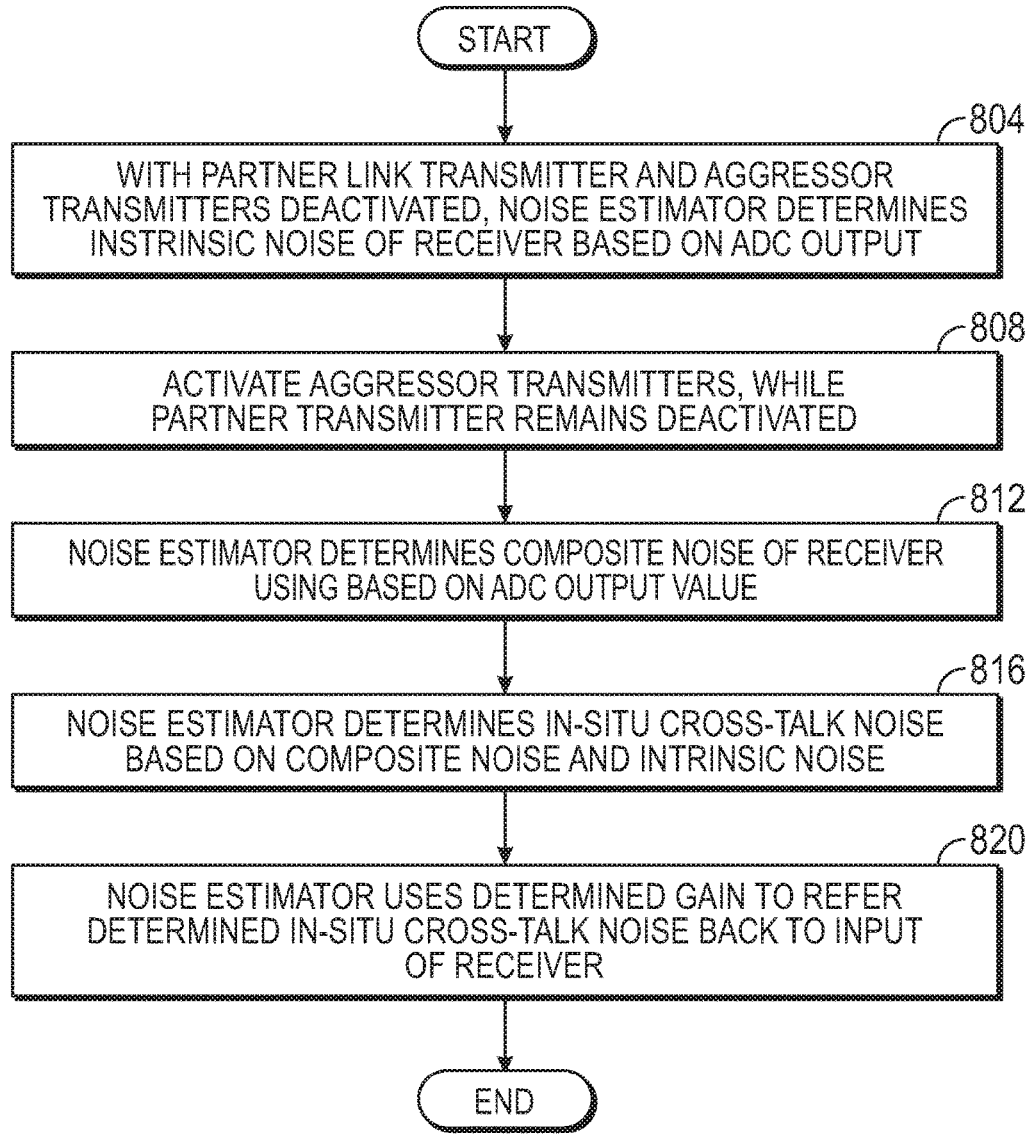
FIG. 8 is a flow diagram depicting a technique to determine an in-situ crosstalk noise at an input node of the receiver using the gain determined in FIG. 7 according to an example implementation.

FIGS. 7 and 8 depict example techniques that may be performed for purposes of performing an in-situ crosstalk noise measurement test for a receiver 130, in accordance with example implementations. In particular, FIG. 7 depicts a technique 700 that may be performed for purposes of conducting a first part of the test to determine an internal gain of the receiver under test between its analog input terminal 216 and its ADC 138. It is noted that the technique 700 may be performed in a variety of different ways, depending on whether the transceiver under test has a local controller, as described above.

Regardless of the particular structure of the transceiver, referring to FIG. 7 in conjunction with FIG. 4, pursuant to the technique 700, the global controller 190 first disables, or deactivates (block 704), the partner link transmitter and the aggressor transmitters of the communication system; and then, pursuant to block 708, the global controller 190 enables the reference source and sets the output of the reference source to a starting value. In this manner, pursuant to block 708, the global controller 190 may, for example, instruct the amplitude detector 454 (either through local controller 145 or directly) to begin a gain phase of the crosstalk noise measurement test. In this gain phase, the amplitude detector 454 may close the switch 419 to enable the bandgap voltage reference circuit 418 so that the circuit 418 provides an output voltage to the input node 216. Moreover, the amplitude detector 454 may set the output voltage level that is provided by the bandgap voltage reference circuit 418 to a particular voltage level.

More specifically, in accordance with some implementations, the bandgap voltage circuit 418 may be a selectable source that may provide, for example, a range of selectable voltage values, as programmed by the amplitude detector 454. As an example, in accordance with some implementations, the amplitude detector 454 may initially set the output voltage of the bandgap reference voltage circuit 418 to the lowest selectable level to begin a possibly iterative process to set the output of the bandgap reference source 418 to the appropriate level.

More specifically, as depicted in FIG. 7, in accordance with some implementations, after setting the output of the bandgap voltage reference source to a particular level, the amplitude detector 454 may determine (decision block 712) whether a sampled voltage is within a target region. For example, in accordance with some implementations, the amplitude detector 454 may read the digital output value provided by the ADC 138 and determine, based on this value, whether the output voltage of the bandgap voltage reference circuit is within a predetermined range of voltages. If not, then, as depicted in block 716, the global controller 190 may adjust the output voltage to be lower if greater than the highest value for the target range or adjust the output voltage to be higher if less than the lowest voltage of the target range.

After the output voltage of the bandgap voltage reference circuit is set to the appropriate level then, pursuant to block 720, the amplitude detector 454 may calculate the gain of the receiver 130 (i.e., the gain of the signal conditioning circuit 224) based on the voltage represented by the ADC 138 and the output voltage setting of the bandgap voltage reference circuit 418. Subsequently, as depicted in block 724, the amplitude detector 454 may deactivate the bandgap voltage reference circuit, such as by for example, opening the switch 419.

FIG. 8 illustrates a technique 800 that may be used in the in-situ crosstalk measurement test for purposes of determining the intrinsic noise, composite noise and ultimately estimating the crosstalk noise at the input node 126 of the receiver under test. More specifically, referring to FIG. 8 in conjunction with FIG. 4, in accordance with some implementations, the technique 800 may be performed after the technique 700 (FIG. 7) and as such, when the technique 800 begins, the aggressor and partner transmitters are still deactivated, or disabled. As depicted in FIG. 8, the noise estimator 460 estimates (block 804) the intrinsic noise of the receiver 130. In this manner, in accordance with example implementations, due to the aggressor and partner transmitters being disabled and the bandgap voltage reference circuit 418 being disabled, the output value provided by the ADC 138 represents the intrinsic noise. Next, in accordance with example implementations, the global controller 190 activates (block 808) the aggressor transmitters, with the partner transmitter remaining off, or deactivated. With the aggressor transmitters being activated, or enabled, the composite noise for the receiver 130 may then be calculated, pursuant to block 812. In this manner, in accordance with example implementations, due to the enablement of the aggressor transmitters and the disablement of the partner transmitter, the output of the ADC 138 provides a digital value that represents the composite noise, i.e., the summation, or output, (at the ADC output), of the intrinsic noise of the receiver 130 and the crosstalk noise.

In accordance with example implementations, the noise estimator 460 may estimate the intrinsic noise by performing an RMS calculation based on the output of the ADC 138 for purposes of determining the intrinsic noise, and the noise estimator 430 may correspondingly determine an RMS calculation of the output of the ADC 138 for purposes of determining the composite noise. Accordingly, pursuant to block 816, the noise estimator 460 may determine the crosstalk noise at the output of the signal conditioning circuit 214 based on the determined composite and intrinsic noises; and moreover, pursuant to block 820, the noise estimator 460 may use the gain determined by the amplitude detector 454 to refer the crosstalk noise measurement back to the input node 216.

In accordance with example implementations, the noise estimator 460 may determine the crosstalk noise at the input node 216 as follows:

$$\text{Crosstalk Noise (RMS) at Input Node 216} = \frac{\sqrt{RMStotal\_noise^2 - RMSintrinsicnoise^2}}{GainRx},$$

where "RMStotal_noise" represents the composite noise referenced to the output of the signal conditioning circuit 214, and "RMSintrinsicnoise" represents the measured intrinsic noise reference to the output of the signal conditioning circuit 214.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   deactivating transmitters of a first plurality of transceivers associated with an endpoint to multi-channel communication fabric, wherein a given transceiver of the first plurality of transceivers comprises a receiver;
   controlling the given transceiver to cause the given transceiver to couple a reference source of the given transceiver to a first node of the receiver, measure a first value at a second node of the receiver, and determine a gain between the first node and the second node based on the measured first value;
   controlling the given transceiver to cause the given transceiver to isolate the reference source from the first node of the receiver;
   measuring, by the given transceiver, a second value at the second node and determining, by the given transceiver, an intrinsic noise based on the measured second value;
   activating the deactivated transmitters;
   measuring, by the given transceiver, a third value at the second node and determining, by the given transceiver, a composite noise based on the measured third value; and
   determining, by the given transceiver, a crosstalk noise at the first node of the receiver based on the determined gain, the determined intrinsic noise and the determined composite noise.

2. The method of claim 1, further comprising:
   deactivating transmitters of a second plurality of transceivers associated with another endpoint to the multi-channel communication fabric,
   wherein the measurements of the first and second values at the second node occur during the deactivation of the transmitters of the first plurality of transceivers and during the deactivation of the transmitters of the second plurality of transceivers.

3. The method of claim 2, wherein:
   a transmitter of the deactivated transmitters of the second plurality of transceivers comprises a partner transmitter for the receiver.

4. The method of claim 3, further comprising:
   activating the deactivated transmitters of the second plurality of transceivers except for the partner transmitter,
   wherein the measurements of the third value at the second node occurs during the activation of the deactivated transmitters of the second plurality of transceivers except for the partner transmitter.

5. The method of claim 1, wherein:
   the first plurality of transceivers is part of a first integrated circuit; and
   deactivating the transmitters of the first plurality of transceivers comprises a global controller associated with a second integrated circuit communicating with a local controller of the first integrated circuit.

6. The method of claim 5, wherein the first and second integrated circuits are disposed on respective first and second circuit cards, the multi-channel communication fabric comprises a backplane connecting first and second circuit card connectors, the first circuit card is installed in the first circuit card connector, and the second circuit card is installed in the second circuit card connector.

7. The method of claim 1, wherein controlling the given transceiver to cause the given transceiver to couple a reference source of the given transceiver to the first node of the receiver, measure the first value at the second node of the receiver, and determine the gain between the first node and the second node based on the measured first value comprises:

coupling the reference source to an input to a signal conditioning circuit of the receiver; and determining the gain based on a digital value provided by an analog-to-digital converter of the receiver.

8. The method of claim 7, further comprising:

adjusting the gain in response to the digital value and a target range for the digital value.

9. The method of claim 8, wherein adjusting the gain comprises adjusting a gain applied by the signal conditioning circuit.

10. The method of claim 1, wherein controlling the given transceiver to cause the given transceiver to couple a reference source of the given transceiver to the first node of the receiver, measure the first value at the second node of the receiver, and determine the gain between the first node and the second node based on the measured first value comprises writing data to at least one control register of the given transceiver.

11. The method of claim 1, wherein determining the crosstalk noise at the first node comprises determining the crosstalk noise at a signal input terminal of the receiver.

12. An apparatus comprising:

an integrated circuit comprising a reference source, a communication interface and a plurality of transceivers, wherein the plurality of transceivers comprises a plurality of receivers and a plurality of transmitters;

wherein the communication interface to control the plurality of transceivers in an in-situ test to determine a crosstalk noise at an analog input of a given receiver of the plurality of receivers, wherein the communication interface is programmable to:

deactivate the plurality of transmitters;

couple the reference source to the analog input of the given receiver to provide a reference signal to the analog input of the given receiver;

provide a first digital value representing a measurement of the reference signal by the given receiver;

isolate the reference source from the analog input of the receiver;

provide a second digital value representing a measurement of an intrinsic noise at the analog input of the given receiver;

activate the deactivated plurality of transmitters; and provide a third digital value representing a composite noise at the analog input of the given receiver.

13. The apparatus of claim 12 wherein:

the integrated circuit comprises a digital signal processor associated with the given receiver;

the given receiver comprises an analog-to-digital converter; and the digital signal processor to determine a gain between the analog input of the given receiver and an input of the analog-to-digital converter of the given receiver based on the first digital value.

14. The apparatus of claim 13, wherein:

the integrated circuit comprises a digital signal processor associated with the given receiver; and the digital signal processor is to:

determine a crosstalk noise at the input of the analog-to-digital converter based on the second digital value and the third digital value; and determine the crosstalk noise at the analog input of the given receiver based on the determined crosstalk noise at the input of the analog-to-digital converter and the determined gain.

15. The apparatus of claim 12, wherein:

the communication interface comprises a plurality of registers writable to cause the communication interface to control the plurality of transceivers in the in-situ test.

16. A system comprising:

multi-channel communication fabric;

a plurality of multi-channel endpoints, wherein each endpoint of the plurality of multi-channel endpoints comprises a plurality of transceivers coupled to the fabric, and each transceiver of the plurality of transceivers comprises a transmitter and a receiver; and a controller to communicate with the plurality of multi-channel endpoints to determine an in-situ crosstalk noise associated with the receiver of a first transceiver of the plurality of transceivers of a given endpoint of the plurality of multi-channel endpoints, wherein the transmitter of the plurality of transceivers of another endpoint of the plurality of multi-channel endpoints is paired with the receiver of the first transceiver, and the controller to communicate with the plurality of multi-channel endpoints to:

deactivate the transmitters;

cause the first transceiver to couple a reference source of the first transceiver to an input of the receiver of the first transceiver, measure a first value at an internal terminal of the receiver of the first transceiver, and determine a gain based on the measured first value;

isolate the reference source of the first transceiver from the input of the receiver;

cause the receiver of the first transceiver to measure a second value at the internal terminal and determine an intrinsic noise based on the measured second value;

activate the transmitters except for the transmitter paired with the receiver of the first transceiver; and cause the receiver of the first transceiver to measure a third value at the internal terminal, determine a composite noise based on the measured third value, and determine the in-situ crosstalk noise based on the determined intrinsic noise, the determined composite noise and the determined gain.

17. The system of claim 16, wherein the receiver of the first transceiver comprise an analog-to-digital converter, and the gain comprises a DC gain between an input terminal of the analog-to-digital converter and an output of the analog-to-digital converter.

18. The system of claim 16, wherein the reference source comprises a bandgap voltage reference circuit.

19. The system of claim 16, wherein the first transceiver comprises a digital signal processor (DSP), and the DSP determines the gain, the intrinsic noise, the composite noise, and the in-situ crosstalk noise at the input of the receiver.

20. The system of claim 16, wherein the gain comprises a DC gain of the receiver of the first transceiver.

* * * * *